United States Patent [19]
Balzer

[11] Patent Number: 5,210,413
[45] Date of Patent: May 11, 1993

[54] PARTIAL PRESSURE GAUGE USING A COLD-CATHODE ION SOURCE FOR LEAK DETECTION IN VACUUM SYSTEMS

[76] Inventor: Richard Balzer, Birchstrasse 25, 8156 Oberhasli, Switzerland

[21] Appl. No.: 741,457
[22] PCT Filed: Nov. 27, 1990
[86] PCT No.: PCT/CH90/00272
  § 371 Date: Aug. 8, 1991
  § 102(e) Date: Aug. 8, 1991
[87] PCT Pub. No.: WO91/09413
  PCT Pub. Date: Jun. 27, 1991

[30] Foreign Application Priority Data

Dec. 8, 1989 [EP] European Pat. Off. ......... 89810932.7

[51] Int. Cl.⁵ ............................................. H01J 49/30
[52] U.S. Cl. .................................. 250/298; 250/294; 250/281
[58] Field of Search ............... 73/40.7; 250/290, 291, 250/294, 298, 282, 281; 324/459, 460, 463

[56] References Cited

U.S. PATENT DOCUMENTS 3,580,052  5/1971  Young ........................... 73/40.7
3,803,481  4/1974  Compton et al. ............. 73/40.7
4,270,091  5/1981  Mann ............................ 324/462
4,761,553  8/1988  Juravic, Jr. ................... 250/298

*Primary Examiner*—Jack I. Berman
*Assistant Examiner*—James Beyer
*Attorney, Agent, or Firm*—Ostrolenk, Faber, Gerb & Soffen

[57] ABSTRACT

The partial pressure gauge consists of a combination of a magnetically confined cold-cathode discharge for the ionization of the residual gas in a vacuum system (ion source) and the magnetic separation of the ion masses (mass spectrometer). A suitable inhomogenous magnetic field configuration is instrumental in producing such a discharge that the energy spread of the ions is sufficiently small, which in turn guarantees the resolution required for mass separation in partial pressure measurements (for purposes of leak detection). The ions are accelerated solely within the electric field of the discharge. The special shape of the cold-cathode discharge influences the electric field in such a manner that the energy of the emitted ions is low and remains virtually independent of the potential applied to sustain the discharge. Due to the low ion energy a moderate magnetic field suffices for the mass separation. Hence, the mass spectrometer and the ion source can be integrated within the same magnetic field assembly.

13 Claims, 1 Drawing Sheet

PARTIAL PRESSURE GAUGE USING A COLD-CATHODE ION SOURCE FOR LEAK DETECTION IN VACUUM SYSTEMS

FIELD OF THE INVENTION

The present invention relates to a partial pressure gauge based on the principle of mass spectrometry, and utilizes a magnetically confined, modified cold-cathode discharge configuration as its ion source.

BACKGROUND OF THE INVENTION

In general, partial pressure measuring instruments are used in conjunction with a test gas in order to locate leaks, measure leak rates and examine the tightness of vacuum systems. They usually operate on the principle of mass spectrometry. In recent years methods have been developed with the aim of simplifying the spectrometers and producing more compact gauges (cf. e.g. UK Patent Application, GB 2191334 A), yet the overall complexity, especially with respect to the generation of ions, has remained considerable.

A particularly compact gauge having a large sensitivity coupled with a cost-effective design could be realized by a combination of magnetic mass separation preceded by an efficacious cold-cathode ion source. Such a gauge would be only slightly more complicated than the customary cold-cathode gauges used for vacuum measurements. Fundamentally, the latter consist of a discharge chamber in which a combination of electric and magnetic fields form a trap for electrons which, in the ideal case, can only leave the discharge after losing energy by collisions with gas molecules; in other words, the electrons cannot reach the anode. The trapped electrons correspond to a large electron current which efficiently ionizes the residual gas in the vacuum. To a first approximation, its magnitude depends on the strengths of the electric and magnetic fields and the geometry of the discharge region and is virtually constant over several decades of the residual gas pressure. Hence the ionization current is proportional to the pressure of the residual gas and corresponds to the discharge current in the gauge. Vacuum gauges based on this principle are well known both in the literature and in practice and are designated as Penning gauges, magnetron gauges or inverted magnetron gauges (Ref: Manfred v. Ardenne, Tabellen zur angewandten Physik, Vol. II (1975) 169-172).

This type of cold-cathode discharge also represents an excellent ion source. However, the energy spread of the ions is so large that if applied to a mass spectrometer, the required resolution, which is proportional to the square root of the relative energy spread $\Delta E/E$, can be attained only if the ions are further accelerated to a higher energy. In turn, higher energetic ions require higher field strengths for mass separation. This is the reason why the mass spectrometers currently employed for leak detection or residual gas analysis utilize essentially sophisticated hot filament ion sources coupled with additional extractions and focussing potentials.

SUMMARY OF THE INVENTION

The invention described herewith relates to a partial pressure gauge based on the principle of mass spectrometry, comprising a mass spectrometer whose ion source is characterized by a magnetically confined cold-cathode discharge which is modified by an inhomogeneous magnetic field in such a manner that ions having a low energy and small energy spread pass through one or several apertures in the cathode, and that without any further acceleration or focussing, these ions are separated and measured according to their momentum in a magnetic field. The fact that the density of electrons in a magnetically confined discharge is determined by both the electric and the magnetic fields underlies the realization of the present invention. By replacing the customary, to a first approximation homogeneous magnetic field in the discharge volume by an inhomogeneous magnetic field having a well-defined peak in the field strength, a locally high density of electrons is obtained which severely restricts the position of ionization of the residual gas. Ions originating in this zone are accelerated by the electric field of the discharge region towards the cathode and can leave the discharge space via apertures therein. As long as the ionization zone lies in the vicinity of the cathode, the energy of the ions emerging from the cathode is low. Due to the low energy, the deflection of the ions is large even in a relatively weak analyzing field. Therefore it is not necessary to impose stringent demands for the apertures separating the different masses to be measured. Secondly, due to the strictly limited ionization zone induced by the shape of the applied inhomogeneous magnetic field, the energy spread of the ions is also small. The position of the ionization zone lying close to the cathode provides the further consequence that the potential difference between the ionization zone and the cathode does not depend much on the operational voltage of the discharge; a virtually constant ion energy is observed even if the discharge voltage is altered by several kilovolts. Hence the essential conditions for adequate mass resolution are fulfilled. Taking all this into consideration, it is seen that the analyzer can readily be integrated in the same magnet assembly which is utilized to produce the cold-cathode discharge. This is particularly simple to realize by the electrode configuration of an inverted magnetron type of cell. The return path of the magnetic flux out of the discharge space runs in a natural manner parallel to the cathode cylinder. Ions emerging through apertures in the cathode directly enter a magnetic field lying perpendicular to their direction of motion. The analysis of the momentum of these ions can therefore be performed very easily.

DETAILED DESCRIPTION OF THE INVENTION

Figure 1:
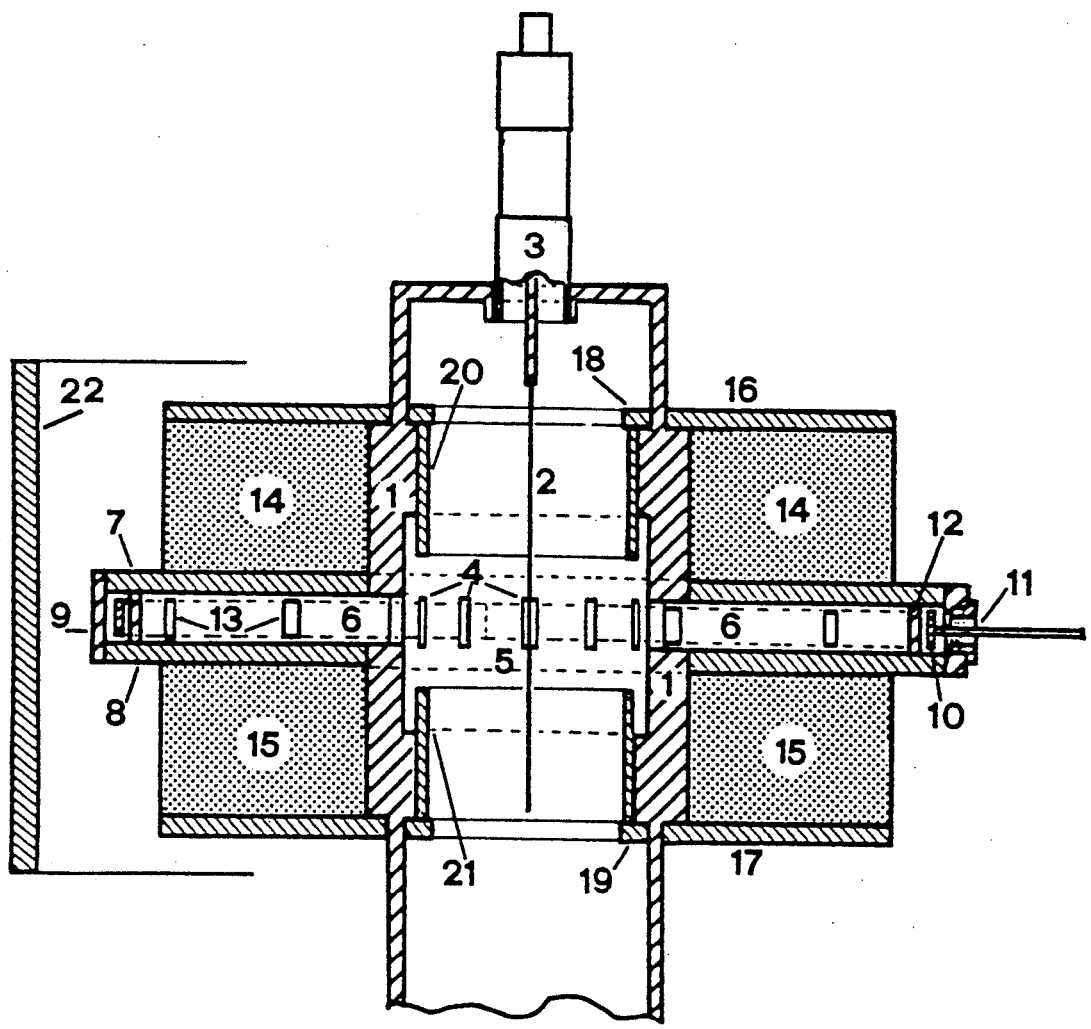
FIG. 1 is a longitudinal cross section in schematic form of a partial pressure gauge constructed according to the considerations outlined above.

The circumference of the cathode cylinder [1] of an inverted magnetron cell with anode [2] and high voltage feed-through [3] is provided with twelve aperture slits [4] through which ions emerge from the discharge region [5] into a cylindrical chamber [6], which is enclosed within the annular pole-pieces [7], [8] and a short cylinder [9], where magnetic separation takes place. An electrically insulated annular ion collector [10] is positioned on the outermost side of the chamber and serves to measure the ion current via a vacuum feed-through [11]. The ion collector [10] is shielded from the cathode apertures [4] by a collimator ring [12] which is also provided with twelve aperture slits [13], all of which are displaced by a certain distance with respect to the cathode apertures [4]. Each aperture [4] in the cathode cylinder [1] together with the corresponding slit [13] in the collimator ring [12] comprises a simple analyzing system in which the displacement of the two apertures with respect to each other determines the range of ion mass numbers for maximum transmission in the analyzer. If the various analyzers are set for the same range of mass numbers and all ion currents are measured by the ion collector [10], then the parallel measurement of all the systems yields a considerably higher current which consequently increases the sensitivity of the instrument. It is also conceivable to consider a lay-out in which the analyzing systems are set either individually or in groups for the different ranges of the mass number, each range possessing its own ion collector, thereby enabling the simultaneous measurement of the various components of the residual gas in the vacuum system.

The magnetic structure of the cell consists of two permanent magnet rings [14], [15], two discs [16], [17] and the annular pieces [18], [19]. The discs, annular pieces as well as the walls [7], [8] of the chamber [6] are made of a ferromagnetic material of high permeability, whereas the cathode cylinder [1] and the outer cylindrical wall [9] are made of a nonferromagnetic material, for e.g., anti-magnetic stainless steel. Thus, just one single magnetic structure is employed to produce the required magnetic field for the discharge region [5] and for the analysis of the emitted ions in the enclosure [6].

An inhomogenous magnetic field having a peak in its field strength in the vicinity of the cathode apertures is an underlying condition for the generation of the characteristic shape of the discharge required for the present invention. In systems having a large diameter of the cathode cylinder and short in length, an adequate peak value of the inhomogenous magnetic field is obtained by the fringing field of the gap [6] superimposed on the axial field of the two magnets. However, in general, the required shape of the magnetic field is formed by introducing suitable flux-guiding elements in the discharge region. In the construction described here, this function is undertaken by two thin-walled cylindrical shims [20], [21], made of a material having a high permeability and which have been attached to the cathode cylinder.

The magnetic separation of the ions ought to be as large as possible. On the other hand, the average magnetic field in the discharge region should be chosen such as to be not much higher than that required for a stable discharge over the entire pressure range (e.g. $10^{-2}$ to $10^{-7}$ Pa) as otherwise the ionization zone, limited by the field inhomogeneity, tends to become diffuse. These two contradictory requirements can however be readily fulfilled by employing strong permanent magnets coupled with the proper magnetic shielding of the embodiment. The latter acts as a magnetic shunt to the discharge region thereby enabling the magnetic field here to be set at its optimal value. Further, it also serves to diminish the disturbing effects of stray magnetic fields.

Extraordinary simplicity is the prime distinguishing feature of the present invention. As exemplified in FIG. 1, the construction is only slightly more complex than that of a commercially available cold-cathode gauge. Likewise, the invention also possesses the properties of being insensitive to vacuum break-downs and to corrosive residual gases in the system. The required electronics correspond essentially to that of a conventional cold-cathode vacuum gauge supplemented by an additional current measurement circuit in the nA-range. The sensitivity of this novel cell is comparable to that of far more sophisticated partial pressure measuring instruments. It should also be emphasized that the ion currents, which are proportional to the partial pressure to be measured, are relatively large. This is reflected from the high output of the type of ion source utilized, and the number of apertures in the cathode functioning in parallel which yield a large effective ion beam cross section. A partial pressure gauge based on the principles described in this invention is particularly suitable for the measurement of the partial pressures of helium and hydrogen; hence its application as an instrument for leak detection. Apart from the partial pressure for a selected mass number, the total pressure can also be measured as the current passing through the cell. Therefore, such a gauge would provide a cost-effective alternative to the currently available high vacuum gauges with the added advantage that the leak-tightness of the vacuum system can be checked at any time. If hydrogen is chosen as the mass number for which the partial pressure gauge is set, the measurement of the $H^+$-ions enables the monitoring of the residual water vapor in the vacuum system.

It is also conceivable to construct a gauge as suggested above in which the species of gas to be measured can be chosen by adjusting the position of the analyzing collimator during operation, or even such a gauge whose individual analyzing systems are set at different mass numbers thereby enabling the simultaneous measurement of the various components of the residual gas in the vacuum system.

I claim:

1. A partial pressure gauge suitable for leak detection in vacuum systems comprising a mass spectrometer and an ion source; said ion source comprising a cold-cathode discharge generated by an electric field and shaped by an inhomogeneous magnetic field, said inhomogeneous magnetic field being essentially confined to a region of equal electrical potential of said cold-cathode discharge such that all ions emitted form said ion source have essentially equal energy; and said emitted ions being directly separated according to momentum in said mass spectrometer in a magnetic field.

2. A partial pressure gauge as claimed in claim 1, also comprising a plurality of mass analyzers and comprising a single magnetic assembly to produce said magnetic field for shaping said discharge in said ion source, as well as for separating ions in said mass analyzers.

3. A partial pressure gauge as claimed in claim 1, also comprising an ion collector and a plurality of mass analyzers; a cylinder-symmetrical, coaxial set-up of said ion source positioned at the center and surrounded by said mass analyzers, and said mass analyzers being surrounded by the ion collector.

4. A partial pressure gauge as claimed in claim 1, also comprising an ion collector and a plurality of mass analyzers; said ion source comprising several ion-emitting apertures, said mass analyzers being set to be sensitive at a given range of mass numbers and the sum of the ion currents being measured by a said ion collector as a means to increase sensitivity of the gauge.

5. A partial pressure gauge as claimed in claim 1, also comprising ion collector and a plurality of mass analyzers; said ion source comprising several ion-emitting apertures and several independent mass analyzers are used, said mass analyzers having corresponding separated ion collectors and being set to be sensitive at different mass numbers as a means for the simultaneous measurement of the partial pressures in different ranges of the mass number.

6. A partial pressure gauge as claimed in claim 1, wherein said mass analyzer comprises means for adjustment either before or during operation of the gauge and means for setting the sensitivity at a given range of mass numbers in which the pressure is to be measured.

7. A partial pressure gauge as claimed in claim 2, also comprising an ion collector; a cylinder-symmetrical, coaxial set-up of said ion source positioned at the center and surrounded by said mass analyzers, and said mass analyzers being surrounded by said ion collector.

8. A partial pressure gauge as claimed in claim 2, also comprising an ion collector and a plurality of mass analyzers; said ion source comprising several ion-emitting apertures, said mass analyzers being set to be sensitive at a given range of mass numbers and the sum of the ion currents being measured by a common ion collector as a means to increase sensitivity of the gauge.

9. A partial pressure gauge as claimed in claim 3, also comprising an ion collector and a plurality of mass analyzers; said ion source comprising several ion-emitting apertures, said mass analyzers being set to be sensitive at a given range of mass numbers and the sum of the ion currents being measured by a common ion collector as a means to increase sensitivity of the gauge.

10. A partial pressure gauge as claimed in claim 2, also comprising an ion collector and a plurality of mass analyzers; said ion source comprises several ion-emitting apertures, and several independent mass analyzers are used, said mass analyzers having corresponding separated ion collectors and being set to be sensitive at different mass numbers as a means for the simultaneous measurement of the partial pressures in different ranges of the mass numbers.

11. A partial pressure gauge as claimed in claim 3, also comprising an ion collector and a plurality of mass analyzers; said ion source comprises several ion-emitting apertures, and several independent mass analyzers are used, said mass analyzers having corresponding separated ion collectors and being set to be sensitive at different mass numbers as a means for the simultaneous measurement of the partial pressures in different ranges of the mass number.

12. A partial pressure gauge as claimed in claim 2, wherein said mass analyzer comprises means for adjustment either before or during operation of the gauge and means for setting the sensitivity at a given range of mass numbers in which the pressure is to be measured.

13. A partial pressure gauge as claimed in claim 3, wherein said mass analyzer comprises means for adjustment either before or during operation of the gauge and means for setting the sensitivity at a given range of mass numbers in which the pressure is to be measured.

* * * * *